(12) United States Patent
Ladvánszky et al.

(10) Patent No.: US 10,153,705 B2
(45) Date of Patent: Dec. 11, 2018

(54) CONTROLLING A MULTI-CHANNEL POWER SUPPLY

(71) Applicant: Telefonaktiebolaget LM Ericsson (publ), Stockholm (SE)

(72) Inventors: János Ladvánszky, Pomaz (HU); Martin Dahlström, Solna (SE); Mats Göran Wilhelmsson, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/119,206

(22) PCT Filed: Feb. 24, 2014

(86) PCT No.: PCT/EP2014/053532
§ 371 (c)(1),
(2) Date: Aug. 16, 2016

(87) PCT Pub. No.: WO2015/124215
PCT Pub. Date: Aug. 27, 2015

(65) Prior Publication Data
US 2017/0054380 A1    Feb. 23, 2017

(51) Int. Cl.
*G05F 1/59* (2006.01)
*H02M 5/275* (2006.01)
(Continued)

(52) U.S. Cl.
CPC .............. *H02M 5/275* (2013.01); *G05F 1/46* (2013.01); *H02M 5/06* (2013.01); *H04L 12/10* (2013.01); *G05F 1/59* (2013.01); *H02J 1/08* (2013.01)

(58) Field of Classification Search
CPC .......... H02J 1/08; H02J 2001/106; H02J 1/14; G05F 1/59
See application file for complete search history.

(56) References Cited

U.S. PATENT DOCUMENTS 4,618,779 A * 10/1986 Wiscombe ................ G05F 1/59
307/60
7,282,899 B1   10/2007 Daun-Lindberg et al.
(Continued)

FOREIGN PATENT DOCUMENTS

EP          2773063 A1    9/2014
WO     2013086720 A1    6/2013

OTHER PUBLICATIONS

Tom, S., "Current balancing in four-pair, high-power PoE applications", Analog Applications Journal, May 18, 2007, pp. 11-18, Texas Instruments Incorporated.
(Continued)

*Primary Examiner* — Harry Behm
(74) *Attorney, Agent, or Firm* — Coats & Bennett, PLLC

(57) ABSTRACT

The present invention relates to methods for controlling a multi-channel power supply and to corresponding devices. According to one embodiment of the invention, a method for controlling a multi-channel power supply is provided. Therein each channel comprises an intrinsic channel resistance and a resistor adjustable between a lowest resistance and a highest resistance. The method comprises the following steps: Measuring for each channel a measure indicative of a current in the respective channel; Adjusting, on the basis of the measures, the adjustable resistor in the channel having the highest intrinsic channel resistance to the lowest resistance; and Adjusting, on the basis of the measures, the adjustable resistor(s) in the remaining channel(s), such that currents in each channel are balanced. With it a concept of simultaneously performing current balancing and reduction of power dissipation is provided.

22 Claims, 6 Drawing Sheets

(51) Int. Cl.
*G05F 1/46* (2006.01)
*H02M 5/06* (2006.01)
*H04L 12/10* (2006.01)
*H02J 1/08* (2006.01)

(56) References Cited

U.S. PATENT DOCUMENTS

| | | | | |
|---|---|---|---|---|
| 2007/0263675 | A1* | 11/2007 | Lum | H04L 12/10 |
| | | | | 713/300 |
| 2009/0201037 | A1 | 8/2009 | Diab et al. | |
| 2010/0164452 | A1 | 7/2010 | Ruan et al. | |
| 2012/0292999 | A1* | 11/2012 | Henkel | G05F 1/56 |
| | | | | 307/52 |
| 2014/0040641 | A1* | 2/2014 | Diab | H04L 12/10 |
| | | | | 713/300 |

OTHER PUBLICATIONS

Pedram, M., "Power Minimization in IC Design: Principles and Applications", ACM Transactions on Design Automation of Electronic Systems, Jan. 1, 1996, pp. 1-66, retrieved on Aug. 16, 2016, retrieved from internet: https://www.semanticscholar.org/paper/Power-minimization-in-IC-design-principles-and-Pedram/4670f6e29f67a1386dh5b5ec2501e96c5171ff82d/pdf.
Fairchild Semiconductor Corporation, "AN-4154 MOSFETs for 60 W High-Power PoE Applications", Application note, Feb. 20, 2014, pp. 1-6, Rev. 1.0.1.

\* cited by examiner

| Con-cept | IA (Amp) | IB (Amp) | IC (Amp) | ID (Amp) | VDSA (mV) | VDSB (mV) | VDSC (mV) | VDSD (mV) | Pdtot (mW) |
|---|---|---|---|---|---|---|---|---|---|
| Off | 0.739 | 1.505 | 3.103 | 0.919 | 148 | 147 | 147 | 148 | 922.76 |
| On | 1.385 | 1.485 | 1.491 | 1.491 | 104 | 119 | 132 | 109 | 680.09 |

CONTROLLING A MULTI-CHANNEL POWER SUPPLY

TECHNICAL FILED

The present invention relates to methods for controlling a multi-channel power supply and to corresponding devices.

BACKGROUND

Multi-channel power supplies show some advantages over single-channel power supplies. For example, some multi-channel power supplies allow channels to be combined in parallel to extend the ranges of the output current. Multi-channel power supplies are e.g. used to supply Telecom racks comprising certain Telecom equipment such as routers and switches. Such Telecom racks may require a power of about 3 kW.

In multi-channel power supplies it is advantageous if the channel currents are equal to each other. Several channels in parallel reduce the current and lower current values are more treatable. For example, it is easier to use more adjusting elements at lower current level than one big one. Then similar components such as circuitry and electric cables can be utilized for every channel which optimizes manufacturing costs of the components and the multi-channel power supply.

A current balancing technique for Power-over-Ethernet (PoE) applications for comparatively low power levels is for example discussed in the Article "Current balancing in four-pair, high-power PoE applications", by Steven R. Tom, in Analog Applications Journal, Texas Instruments, February 2007.

Modern power supplies regulate channel currents by utilizing FETs (Field Effect Transistors). If these FETs dissipate too much power then they will be hot during operation, and this decreases lifetime of these components.

The importance or reducing power dissipation in general is, for example, discussed in the context of low power integrated circuits in the Article "Power Minimization in IC Design: Principles and Applications" by Massoud Pedram, ACM Transactions on Design Automation of Electronic Systems, Vol. 1, No. 1, January 1996, see particularly pages 3 to 56. Accordingly, in electronics industry power dissipation is today as important as performance and area. The Article presents for example an in-depth survey of techniques for designing low power digital CMOS circuits and systems and describes the many issues facing designers at architectural, logic and physical levels of design abstraction.

Current balancing for multi-channel power supplies on the one hand and reducing power dissipation on the other hand are reasonable goals. Some existing multi-channel power supplies comprise a controller for current balancing and show comparatively large power dissipation.

Accordingly there is a need for techniques that balance channel currents and minimize total dissipated power for a multi-channel power supply. Such techniques shall potentially increase life time of a multi-channel power supply and/or reduce dissipated power.

SUMMARY

In this application a combined approach is proposed, that is optimizing current balancing and reduction of power dissipation in a combined or simultaneous way. Such concepts are taken into account for a design of a multi-channel power supply or a controller thereof. The proposed approach shows that the concepts of current balancing and reducing of power dissipation for multi-channel power supplies are not contradictory.

According to one embodiment of the invention, a method for controlling a multi-channel power supply is provided. Therein each channel comprises an intrinsic channel resistance and a resistor adjustable between a lowest resistance and a highest resistance. The method comprises the following steps: Measuring for each channel a measure indicative of a current in the respective channel; Adjusting, on the basis of the measures, the adjustable resistor in the channel having the highest intrinsic channel resistance to the lowest resistance; and Adjusting, on the basis of the measures, the adjustable resistor(s) in the remaining channel(s), such that currents in each channel are balanced.

According to one embodiment of the invention, an apparatus for controlling a multi-channel power supply is provided. Therein each channel comprises an intrinsic channel resistance and a resistor adjustable between a lowest resistance and a highest resistance. The apparatus comprises: a meter unit for measuring for each channel a measure indicative of a current in the respective channel, and a controller for adjusting, on the basis of the measures, the adjustable resistor in the channel having the highest intrinsic channel resistance to the lowest resistance and for adjusting, on the basis of the measures, the adjustable resistor(s) in the remaining channel(s), such that currents in each channel are balanced.

According to one embodiment of the invention, an apparatus for controlling a multi-channel power supply is provided. The apparatus is adapted to perform the above method.

According to one embodiment of the invention, a multi-channel power supply is provided. The power supply comprises an apparatus for controlling the multi-channel power supply according to the above embodiments.

According to one embodiment of the invention, a computer program or a computer program product comprising program code to be executed by a controller of a multi-channel power supply is provided. The execution of the program code causes the multi-channel power supply to operate in accordance with the above method.

Details of such embodiments and further embodiments will be apparent from the following detailed description.

DETAILED DESCRIPTION

In the following, various embodiments will be explained and discussed in more detail by referring to exemplary embodiments and to the accompanying drawings. The illustrated concepts relate to control of a multi-channel power supply. Generally at least some of the discussed functionalities may be implemented in a control unit comprising one or more (programmable) processors or a hardwired part such as a circuit or a combination thereof.

Figure 1:
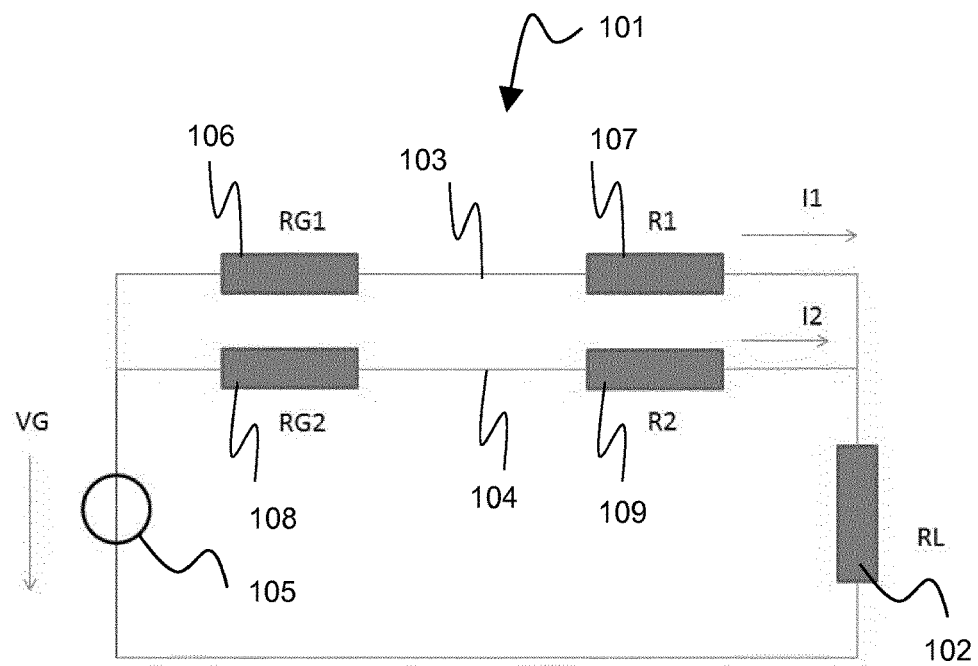
FIG. 1 schematically illustrates an exemplary model of a two-channel power supply supplying a load.

FIG. 1 schematically illustrates a model of a two-channel power supply 101 supplying a load 102 having a load resistance RL. A first channel 103 comprises a first intrinsic channel resistance modeled by a resistor 106 having resistance RG1 and an adjustable resistor 107 having adjustable resistance R1. A second channel 104 comprises a second intrinsic channel resistance modeled by resistor 108 having resistance RG2 and an adjustable resistor 109 having adjustable resistance R2. The resistors 106 and 108 typically model wire and other resistances between the generator and the adjustable resistors 107 and 108. The adjustable resistors 106 and 107 are, for example, implemented by using transistors such as a field effect transistors. Then the adjustable resistances R1 and R2 model a channel resistances of a transistor, respectively. A voltage generator 105 provides a generator voltage VG and supplies the load resistance RL with a current I1 via the first channel 103 and a current I2 via the second channel 104.

For the two-channel power supply 101, it is now shown that current balancing and power minimization are not contradictory. For power supplies having more channels, the proof is similar.

Operation of the model according to FIG. 1 may be described as follows: In a first circle, the generator voltage VG is equal the voltage of RG1, R1 and RL. The voltage is computed by multiplying the respective resistance by the current in the respective resistance:

$$V_G = (R_{G1} + R_1) I_1 + R_L (I_1 + I_2) \quad (1)$$

In a second circle, the generator voltage VG is equal the voltage of RG2, R2 and RL. Again, the voltage is computed by multiplying the respective resistance by the current in the respective resistance:

$$V_G = (R_{G2} + R_2) I_2 + R_L (I_1 + I_2) \quad (2)$$

For optimal current balancing it is required that the current in each channel, i.e. in first channel 103 and in second channel 104 are equal:

$$I_1 = I_2 \quad (3)$$

To minimize power dissipation the total dissipated power, i.e. the sum of the dissipated power P_R1 in adjustable resistor R1 and of the dissipated power P_R2 in adjustable resistor R2, is to be minimized:

$$P_{R1} + P_{R2} = \text{min.} \quad (4)$$

Thereby the dissipated powers are proportional to the square of the current in the respective resistor: $P_{R1} = R_1 I_1^2$ and $P_{R2} = R_2 I_2^2$.

During initial transient, the resistances R1 and R2 shall be adjusted so that the currents I1 and I2 are equal.

According to the model of FIG. 1, the generator voltage Vg, the channel resistances RG1 and RG2 and the load resistance RL are known. The adjustable resistances R1 and R2 and the currents I1 and I2 are the quantities to be determined. They are determined such that the above system of equations (1) to (4) is fulfilled. As this system of equations has the same number of equations as unknowns, it is solvable. A solution of the system of equation fulfills the requirement of equal currents, equation (3), and of mimimal power dissemination, equation (4) in the model of FIG. 1 reflected also in equations (1) and (2). With it it is shown that current balancing and power minimization are not contradictory to one another as there is the same number of equations and unknowns. This is true for any number of channels.

From a theoretical perspective, in scenarios, in which the number of equations is greater than the number of unknowns, the requirements of current balancing and power minimization would be contradictory. In scenarios in which the number of equations is less than the number of unknowns, many solutions exist.

In the model of FIG. 1 the channel resistances RG1 and RG2, and the adjustable resistances R1 and R2 are typically much smaller than the load resistance RL. Therefore the sum of the channel current is approximately the generator voltage divided by the load resistance: I1+I2≈VG/RL. In case the channel currents currents I1 and I1 are equal, see requirement of equation (3), the total dissipated power on the adjustable resistors R1 and R2 is approximately Pd≈(VG/2RL)^2*(R1+R2). In the model of FIG. 1, the generator voltage and the load resistance are fixed values. So the total dissipated power Pd is minimal when the resistance R1+R2 is minimal.

In view of this a strategy to minimize power dissipation and to achieve current balancing is as follows: Determine or find which of the resistances RG1 and RG2 is greater. The adjustable resistance R1 or R2 that is in the channel of the greater channel resistance is adjusted to the lowest possible value. Then the other adjustable resistance is adjusted so that the currents are equal.

For example, in case the resistance RG2 is larger than resistance RG1, than resistance R2 is adjusted to the lowest possible value. The resistance R1 is adjusted such that the channel currents I1 and I2 are equal. With it power dissipation is minimized and current balancing is achieved.

Subsequently it is focused on implementing the above discussed strategy. Thereby it is focused, as an example, on a four-channel scenario. Above findings are at first translated into error functions. A first error $err_{1i}$ is of the following form:

$$err_{1i} = w_1 \left( I_i - \frac{1}{4} \sum_{j=1}^{4} I_j \right), \text{ where } i = 1, 2, 3, 4. \quad (5)$$

For each channel i the deviation between the current Ii in channel i and the average current $$\frac{1}{4}\sum_{j=1}^{4} I_j$$

of the four channels. The average current is determined by adding the currents Ij of the four channels and dividing by four. The error function is further weighted by weight w1 The weight w1 is e.g. used to adjust the convergence speed to arrive at a wanted or optimal solution or e.g. to translate the determined current into a voltage. Typical values are in the range of 0.1 to 10 for w1. The error err_1$i$ is proportional to the deviation of the ith channel current Ii from the average channel current. For determining the error err_1$i$ it may be required to measure the currents in each channel or to measure any other measure indicative of the respective channel currents. In case the error err_1$i$ is zero for all channels i, it is achieved that the currents in the channel are equal. So the requirement that the err_1$i$ shall be zero is similar to the requirement as defined in equation (3) according to which it is required that channel currents are balanced, i.e. that channel currents are equal in every channel of a multi-channel power supply.

A second error is of the following form:

$$err_2 = w_2 \sum_{j=1}^{4} I_j^2 \qquad (6)$$

The squares of the channel currents I_j for j=1, 2, 3, 4 is added up and weighted by a weight w2. The weight w2 is e.g. used to adjust the convergence speed to arrive at a wanted or optimal solution. Typical values for w2 are in the range of 1 u to 100 u. The error err2 is proportional to the total dissipated power. For determining the error err2 it may be required to measure the currents in each channel or to measure any other measure indicative of the respective channel currents. Setting the adjustable resistances such that this error is minimized is equivalent similar to the requirement as discussed with respect to equation (3).

Figure 2:
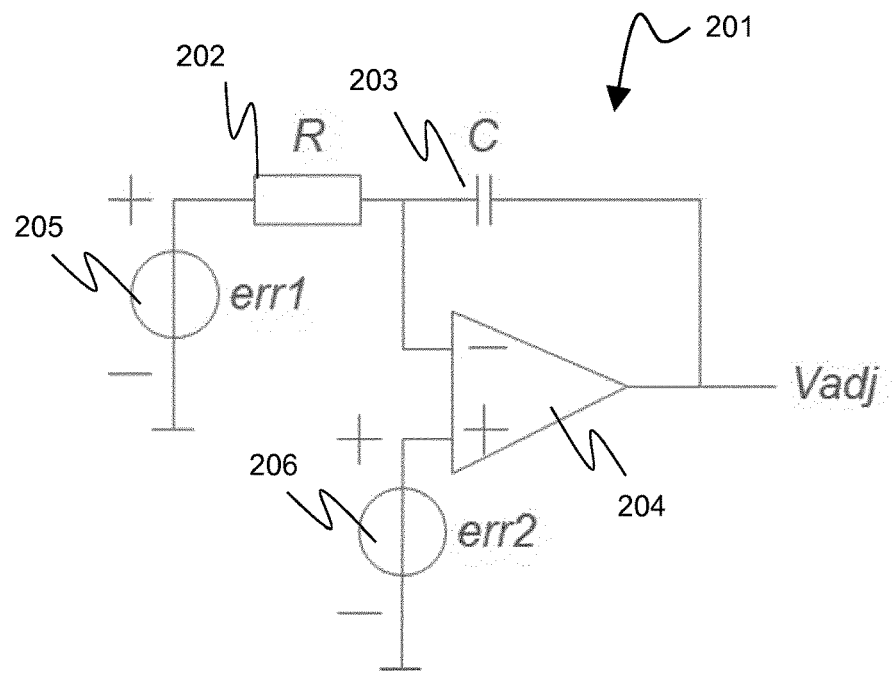
FIG. 2 schematically illustrates an exemplary control circuit for controlling an adjustable resistor of a multi-channel power supply according to an embodiment of the invention.

FIG. 2 schematically illustrates an exemplary control circuit 201 for controlling an adjustable resistor of a multi-channel power supply. The control circuit 201 may support current balancing and minimization of power dissipation in a multi-channel power supply. Functionality discussed here may also at least partly be implemented in a programmable device. The circuit 201 determines a control voltage V_adj to control an adjustable resistance in one channel of a multi-channel power supply. Each adjustable resistor in each of the channels may be controlled by a respective control voltage V_adj. So the circuit 201 in FIG. 2 may be repeated for each channel of a multi-channel power supply. Thereby the error err_1$i$ is dependent on the respective channel, while err2 is identical for each channel. The circuit 201 comprises a typical integrator circuit model comprising a resistor 202 having resistance R, a capacitor 203 having capacity C, and an operational amplifier 204, interconnected as depicted in FIG. 2. For one channel, the input voltage of the operational amplifier 204 is determined on the basis of a voltage proportional to error err1 for this channel and on the basis of a voltage proportional to error err2, which is identical for every channel.

For implementing the adjustable resistances a good choice is to utilize enhancement mode Field Effect Transistors (FETs). Such FETs may be controlled via a gate-to-source voltage: The greater the gate-to-source voltage, the smaller the channel resistance of the FET. The utilization of a FET is an example to implement the adjustable resistances such as R1 and R2 in FIG. 1.

In FIG. 2 a voltage 205 proportional to err1 is connected to a negative input of the integrator circuit, while a voltage 206 proportional to err2 is connected to a positive input of the integrator circuit.

The greater err2, the greater the control voltage V_adj and the smaller the channel resistance of the FET, i.e. the more the corresponding FET channel is open. Smaller channel resistance in the FET also means smaller dissipated power.

Typically, all errors err_1$i$ are limited from below, e.g. by zero. In this case, regulation starts with that err_1$i$ which is zero, that means current value in that channel is lower than the average, and that is because the intrinsic resistance in that channel is the greatest. This is an example, how the circuit finds the greatest intrinsic resistance. If the current in one channel is below the average current, then this contributes to further increase the control voltage V_adj which in turn contributes to reducing the adjustable resistance in the respective channel. If err_1$i$ is larger than zero then this reduces the control voltage V_adj which in turn contributes to increasing the adjustable resistance.

In the described way, on the basis of measuring measures indicative of the channel current voltages proportional to the errors err_1$i$ and err2 are determined. These voltages are used as input to a integrator circuit in the described way to determine a control voltage utilized to control the adjustable resistor implemented by a FET. The voltage proportional for err_1$i$ depends on the respective channel. For each adjustable resistance separate control voltages V_adj,i are obtained.

The operation of the circuit 201 including exemplary integrator circuit may be described in the following equation. The control voltage V_adj,i is approximately determined by $$V_{adj\,i} \approx \frac{1}{\tau} \int (err_2 - err_{1i}) dt \qquad (7)$$

Therein V_adj,i is the control voltage for an adjustable resistance in channel i. The difference between err2 and err_1$i$ is integrated. The parameter $\tau$ may define a duration of the integration process or normalize the result of the integration. Typical values of parameter $\tau$ are 10 u to 10 m.

The voltage V_adj,i may be obtained from the circuit structure as described with respect to FIG. 2. A value proportional to Vadj,i may also be determined based on computations performed on a processor or controller unit such as a micro controller. For example, the equation (7) is easily programmable. Transitions from V_adj,i or a value proportional to V_adj,i to a control voltage such as a gate-to-source voltage of a FET are strictly monotonic.

Figure 3:
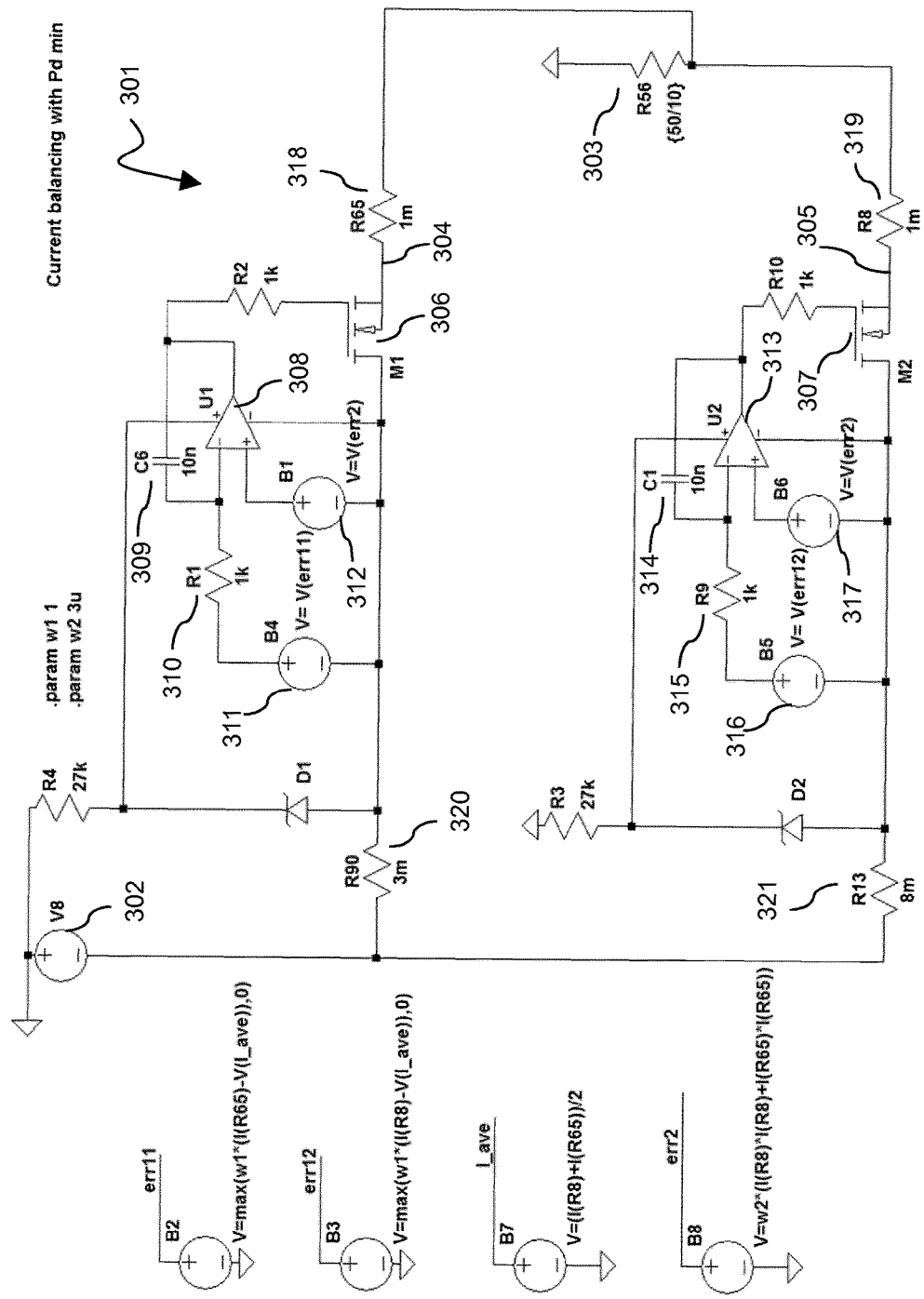
FIG. 3 shows an exemplary model of a control circuit controlling a two-channel power supply according to an embodiment of the invention.

FIG. 3 shows in detail an exemplary model of a control circuit for controlling a two channel power supply. The control circuit is adapted for combined current balancing and minimization of power dissemination. A voltage generator 302 supplies a load resistor 303 with a current via a first channel 304 and via a second channel 305. In the first channel 304 an adjustable resistance is implemented by an FET 306. The adjustable resistance of the FET 306 in the first channel 304 is controlled by a voltage provided by the operational amplifier 308. The operational amplifier 308 together with the capacitor 309 and the resistor 310 provide a typical integrator circuit as discussed with respect to FIG. 2. The error voltage 311 is proportional to an error err_11, i.e. error indicating a deviation between current in first channel from an average current, as discussed above. The error voltage 312 is proportional to an error err2 indicating a dissipated power of the FETs 306 and 307. The components 308, 309, 310, 311, 312 and their interconnections provide an integrator circuit as discussed with respect to FIG. 2.

The second channel is controlled in a similar manner: In the second channel 305 an adjustable resistance is implemented by a FET 307. The adjustable resistance of the FET 307 in the second channel 305 is controlled by a voltage provided by the operational amplifier 313. The operational amplifier 313 together with the capacitor 314 and the resistor 315 provide a typical integrator circuit as discussed with respect to FIG. 2. The error voltage 316 is proportional to an error err_12, i.e. error indicating a deviation between current in the first channel from an average current, as discussed above. The error voltage 317 is proportional to the error err2 indicating a dissipated power of the FETs 306 and 307. The components 313, 314, 315, 316, 317 and their interconnections provide an integrator circuit as discussed with respect to FIG. 2

The resistors 320 and 321 model intrinsic resistances of the supply, that is mainly due to the cable between the source and the adjustment circuit. The resistors 318 and 319 are in this example 1 milliohm resistors. They are e.g. utilized to measure the voltage drop on them and thus the channel currents. For example, the voltage drops on the resistors 318 and 319 are measured and the channel currents are calculated based thereon.

For the analysis, the errors err_11 and err_12 are bounded below by zero. For this analysis, a resistance of generator resistor 320 of the first channel 304 is 3 milliohms while for the second channel 305 a resistance of generator resistor 321 is set to 8 milliohms. The resistors 320 and 321 in FIG. 3 have a similar function as the resistors 106 and 108 in FIG. 1, respectively.

Figure 4:
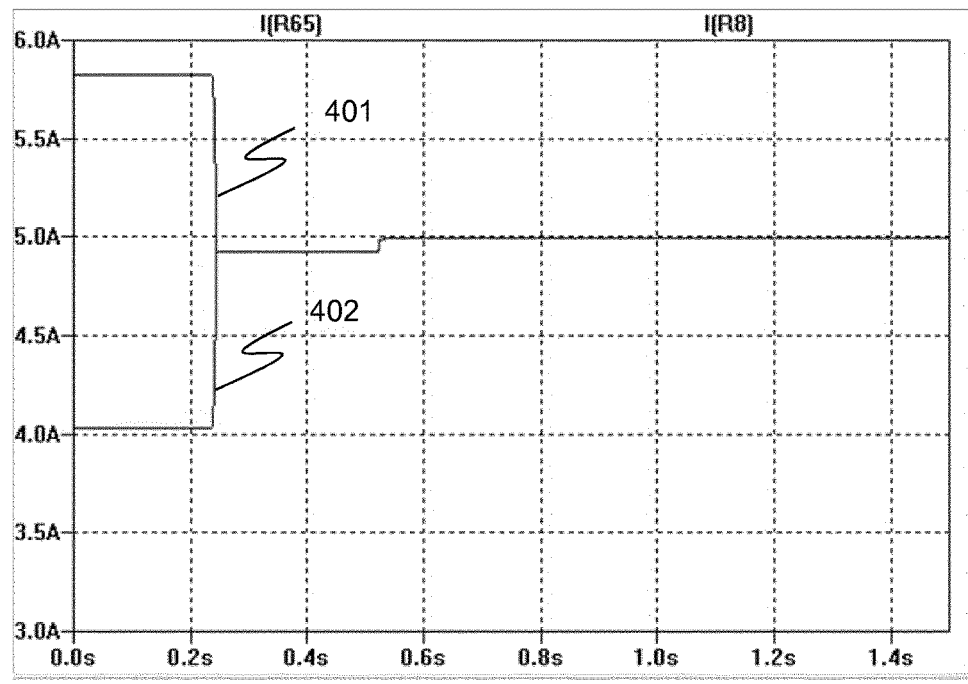
FIG. 4 shows a plot of experimental results of channel currents against time on the basis of the model described in FIG. 3.

FIG. 4 shows a plot of experimental results of channel currents against time on the basis of the model described in FIG. 3. A curve 401 shows the current in resistor 318 which equals the current in the first channel. A curve 402 shows the current in resistor 319, which equals the current in the second channel. After a short period of time (settling time), currents in both channels are balanced, i.e. they are equal.

Figure 5:
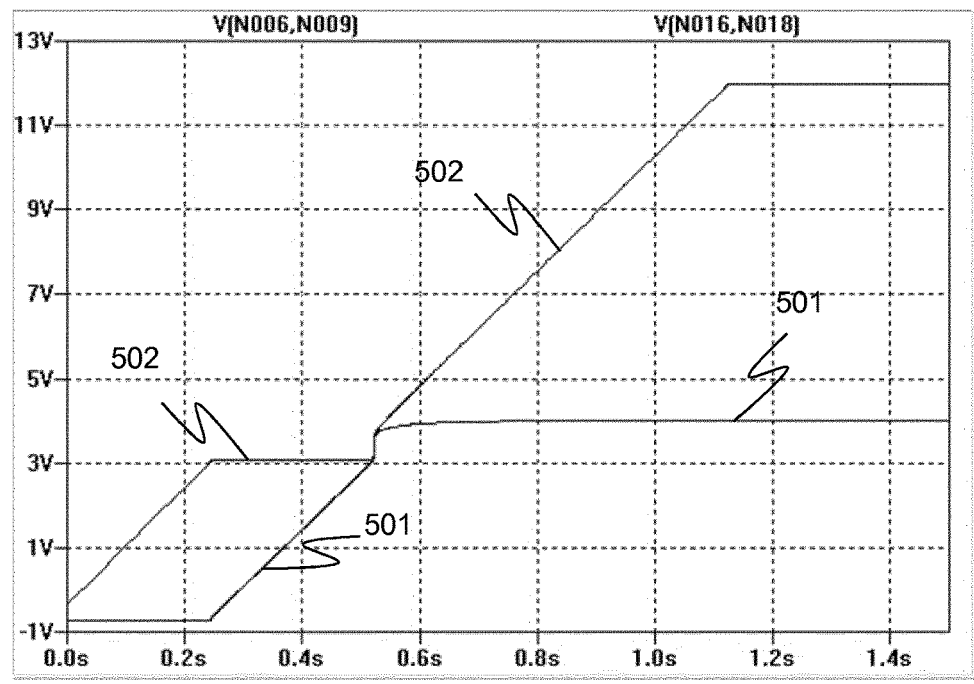
FIG. 5 shows a plot of experimental results of control voltages against time on the basis of the model described in FIG. 3.

FIG. 5 shows a plot of experimental results of control voltages against time on the basis of the model described in FIG. 3. Here, the control voltages are gate-to-source voltages of the FETs 306 and 307 in FIG. 3. A curve 501 shows the gate-to-source voltage at FET 306, a curve 502 shows the gate-to-source voltage at FET 307. The gate-to-source voltage of FET 307 is increased to the highest value. In this example, the current controlling FETs are so called enhancement mode FETs. That means there is no channel at zero gate-to-source voltage. The channel is generated and enhanced with increasing gate-to-source voltage. For largest gate-to-source voltage, that is set to 12 V in this example circuit, the channel resistance is the smallest. The voltage of 12 V is determined by Zener diodes D1 and D2, separately for the two channels. So, according to curve 502 the second channel 305 is opened as much as possible. In other words, the channel resistance is adjusted to the lowest possible value.

Figures 6, 7:
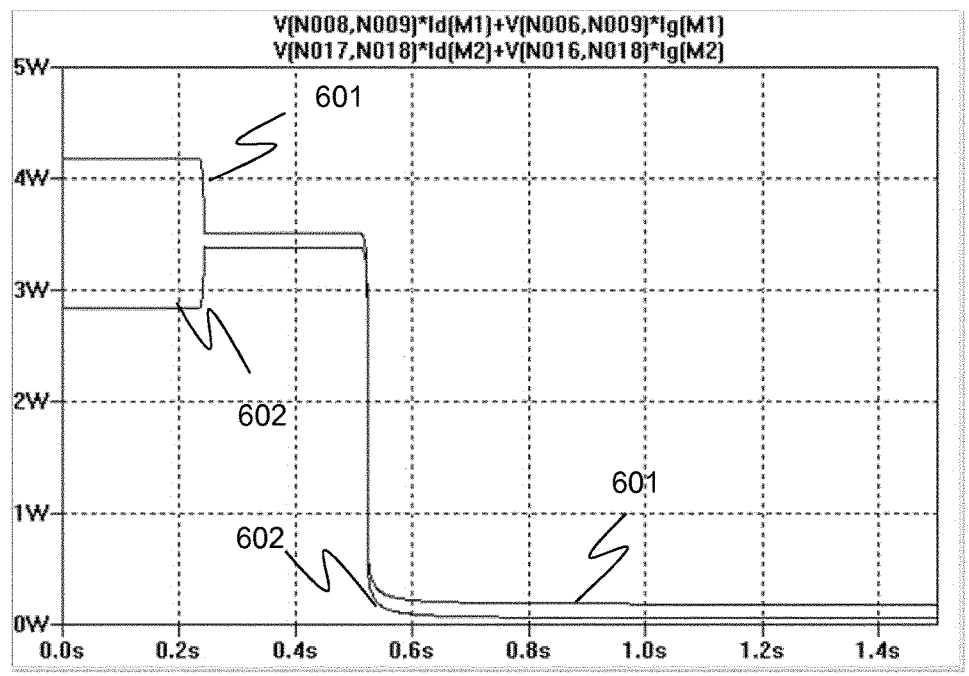
FIG. 6 shows a plot of experimental results of dissipated power against time on the basis of the model described in FIG. 3.
FIG. 7 shows a table including numerical results of an experiment in a four-channel environment according to an embodiment of the invention.

FIG. 6 shows a plot of experimental results of dissipated power against time on the basis of the model described in FIG. 3. In particular, FIG. 6 shows a plot comprising curves of the dissipated power in the adjustable resistors (FETs). A curve 601 shows the dissipated power in FET 306 against time, a curve 602 shows the dissipated power in FET 307 against time. After a settling time the dissipated power is minimal.

FIG. 7 shows a table including numerical results in a four channel environment. For the numerical results parameters are set as follows: tau=30 ms, w1=1, w2=3 u, VG=45 V, and total load current of 5 A. There is the option of including the concept of joint current balancing and minimization of dissipated power and the option to not include the concept. If the concept is not included, the control voltages V_adj are set manually for each channel. In this example they are set to 147 to 148 mV. When including the concept, a sampling rate is 10 ms. FIG. 7 show in particular for the options that the concept of joint current balancing and minimization of dissipated power is either enabled or disabled currents in each of the four channels, named IA, IB, IC, and ID, the control voltages (drain-source voltages) of the four FETs VDSA, VDSB, VDSC, VDSD and the total dissipated power Pd_tot. In case the concept is enabled, currents are balanced and the total dissipated power is reduced.

Figure 8:
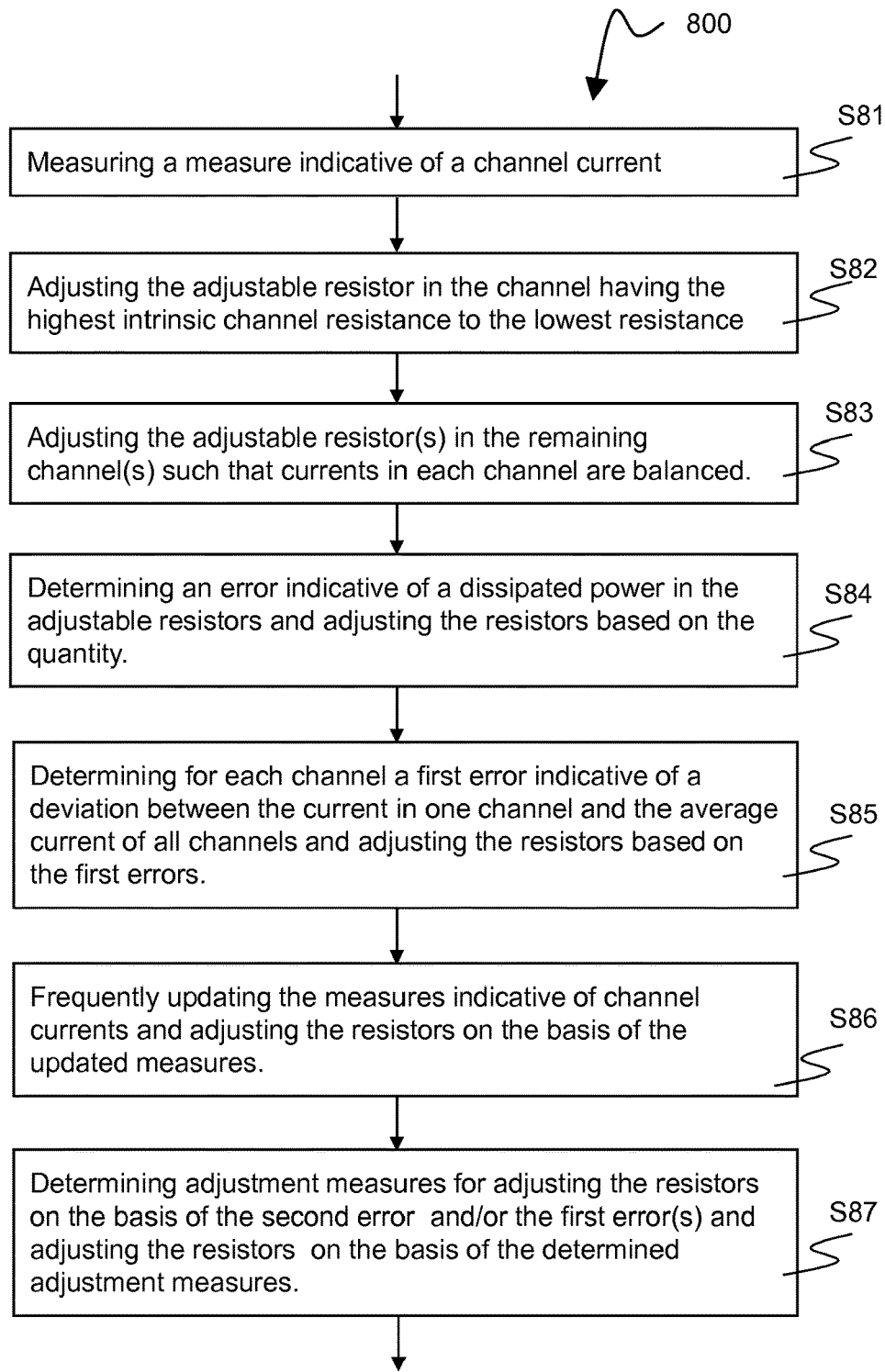
FIG. 8 shows a flowchart for illustrating a method for controlling a multi-channel power supply according to an embodiment of the invention.

FIG. 8 shows a flowchart for illustrating a method for controlling a multi-channel power supply according to an embodiment of the invention. For example, the method steps of FIG. 8 may be implemented in an apparatus for controlling a multi-channel power supply.

Such an apparatus may be or may comprise a controller, a control circuit, a similar a control unit or a combination thereof. A controller may comprise one or more processor(s). Such processor(s) may execute correspondingly configured program code. At least some of the corresponding functionalities may be implemented in a circuit or may be hardwired in the processor(s).

Each channel of the multi-channel power supply comprises an intrinsic channel resistance and a resistor adjustable between a lowest resistance and a highest resistance. Controlling a multi-channel power supply may comprise controlling a current in channel or the adjustable resistor of a channel.

Typically the multi-channel power supply supplies a load with a load current. The load current is thereby transferred via separated channels. Each channel may supply a separated cable to the load. The channels may be isolated from each other.

The intrinsic channel resistance may comprise a generator resistance, a line resistance, a connection resistance or any other resistance that is inherent to the setup of one channel.

The adjustable resistor is a resistor that can be adjusted to a certain resistance. The adjustment may be done on the basis of a control voltage. The adjustable resistor may be implemented on the basis of a transistor. For example, a control voltage applied to the transistor may adjust a resistance in the transistor. Depending on the components utilized for implementing the adjustable resistor the resistance may be set within a certain range. The lowest adjustable resistance may typically be above zero, the highest adjustable resistance may depend on the highest possible control voltage or may be inherent to the setup of components used for implementing the adjustable resistor. Optimally the highest value will be infinite.

In a step S81, for each channel a measure indicative of a current in the respective channel is measured. The measuring may be done by meter such as an ampere meter, a sensor or sensor circuit of a controller of the multi-channel power supply. A typical choice of a measure is the current itself of the respective channel as this measure is comparatively easy measurable.

In a step S82, on the basis of the measures provided by the measurements of step S81, the adjustable resistor in the channel having the highest intrinsic channel resistance is adjusted to the lowest resistance. The channel having the highest intrinsic channel resistance may be determined implicitly or explicitly by the method. The method may comprise a step of determining the channel having the highest specific channel resistance. The lowest resistance relates to the lowest resistance that can be adjusted by the adjustable resistor.

In a step S83, on the basis of the measures provided by the measurements of step S81, the adjustable resistor(s) in the remaining channel(s) are adjusted, such that currents in each channel are balanced. Ideally, balanced channel currents are equal channel currents.

With the described method the currents in the channels are balanced and at the same time the power dissipated by the adjustable resistors is minimized.

Advantageously, each channel of the multi-channel power supply is built of equivalent components. This may result in simplified manufacturing and low production costs. The components may comprise the adjustable resistor and/or a structure to control the adjustable resistor and/or cables and wires of the channel.

Advantageously, each adjustable resistor comprises a transistor, such as a field effect transistor. It is particularly advantageously that an enhanced mode field effect transistor is utilized. Adjustable resistors may be implemented on the basis of transistors and the adjustment of the resistor may be performed by a control voltage of the transistor. Enhanced mode field effect transistors show the feature that the greater the gate-to-source voltage the smaller is the channel resistance. So the gate-to-source voltage of the mode transistor, which suggests to utilize such a device for implementing the adjustable resistor.

Advantageously, the multi-channel power supply comprises two, four, eight or sixteen channels. In general, however, any number of channels may be selected.

In an optional further step S84, on the basis of the measures, a second error indicative of a dissipated power in the adjustable resistors is determined. For example, the second error is indicative of a quantity such as the sum of the squares of the channel currents. The adjustable resistors are then adjusted, e.g. in the way as discussed with respect to step S82 and S83, at least partly on the basis of the determined quantity. For example, the adjustable resistors are adjusted, based on the second error, such that power dissemination of the adjustable resistors is minimized. The second error may help to minimize dissipated power in an efficient way. An example of the second error indicative of a dissipated power is the error "err2" as discussed e.g. with respect to the FIGS. 2 and 3 and with respect to equation (6).

Advantageously, the second error is weighted by a parameter. An example of such a parameter is the parameter w2. The parameter may be set in a way such that a time till the resistors are adjusted to optimal values, e.g. such that currents are balanced and/or power dissipation is minimized, is reduced. In other words, a convergence speed of the method can depend on this value. As an example, a value of this parameter may be set to 3 micro. It is referred to micro by letter u. Such a value is e.g. chosen in the model of FIG. 3. For example, the parameter may be set in the range of 1 u to 100 u.

In an optional further step S85, on the basis of the measures, a first error indicative of a deviation between the current in one channel and the average current of all channels is determined for each channel. The adjustable resistors are adjusted on the basis of the first errors, e.g. to at least partially support the adjustment as discussed with respect to step S82 and S83. For example, the adjustable resistors are adjusted, based on the first error, such that currents in the channels are balanced.

While the second error indicative of a dissipated power may be particularly utilized to support minimization of power dissipation, the first error indicative of a deviation between the current in one channel and the average current may be particularly utilized to support current balancing. In this respect it is particularly advantages to adjust the resistors based on both, the second error indicative of a dissipated power and the first error.

Advantageously, the first error(s) is weighted by a first parameter. An example of such a parameter is w1 as discussed above. The parameter may be set in a way such that a time till the resistors are adjusted to optimal values, e.g. such that currents are balanced and/or power dissipation is minimized, is reduced. In other words, a convergence speed of the method may depend on this value. As an example, the first parameter may be set to 1. Such a value is e.g. chosen in the model of FIG. 3. For example, the first parameter may be set in the range 0.1 to 10.

In an optional step S86, the measures indicative of channel currents may be frequently updated. The adjustable resistors are then adjusted on the basis of the updated measures. This may also comprise that the second error indicative of a dissipated power and/or the first error(s) are frequently updated. Corresponding measurements may be continuously be made or may be frequently redone. In the exemplary practical realization as discussed with respect to FIG. 3, the update time is 10 ms. Typically, the update time will be in the range of 1 to 100 ms. Such a value may be set in a software. The update time is in general different than the time constant τ, tau, as discussed with respect to the integrator concept of equation (7) and FIG. 2. For example, the time constant τ, tau, may be set in the range between 10 u and 10 m.

After one or several updates, a situation is automatically achieved in which the resistor in the channel having the highest specific channel resistance is adjusted to the lowest resistance and the resistors in the remaining channels are adjusted such that currents in each channel are equal.

Further, if a scenario in which the multi-channel power supply is operated is changing the method will correspondingly update the adjustments of the resistors to optimal values. For example, if an intrinsic channel resistance changes due to changing temperature or climate change or due to aging, the method may automatically adjust the adjustable resistors to updated optimal values, which e.g. result in minimum power dissipation and current balancing in the changed environment.

In an optional step S87, adjustment measures for adjusting the resistors on the basis of the second error and/or the first error(s) are determined. The resistors may then be adjusted on the basis of the determined adjustment measures. For example, the resistance of an adjustable resistor may be proportional to an adjustment measure, such as a control voltage.

An example of an adjustment measure is a control voltage such as a control voltage of a transistor circuit acting as adjustable resistor. The source-to-gate voltage of a FET discussed in this application in detail is an example of a control voltage.

Advantageously, determining adjustment measures comprises determining adjusting measures by integrating the difference of the second error and the first error over a time interval. The second error relates to a dissipated power and is typically positive, so the second error after integration may contribute to a positive adjustment measure. The first error may in principle be positive or negative, e.g. depending on whether a certain channel current is below or above an average current. The first error may be limited from below. A lower limit may be set to zero. In case the second error is limited from below to zero it can only contribute to decreasing the adjustment measure. The adjustment measure may be used to adjust the resistors. As a consequence, channel currents may change and measures indicative of channel currents may be updated and be a basis for further adjustments. In this respect a control loop is realized. A result is an optimal adjustment of the adjustable resistors, in a way that channel currents are balanced and power dissipation is minimized.

The steps discussed with respect to FIG. 8 can be performed in any reasonable order. For example, typically measures or error quantities may be determined before adjusting the adjustable resistors. Several of the discussed steps are optional.

Figure 9:
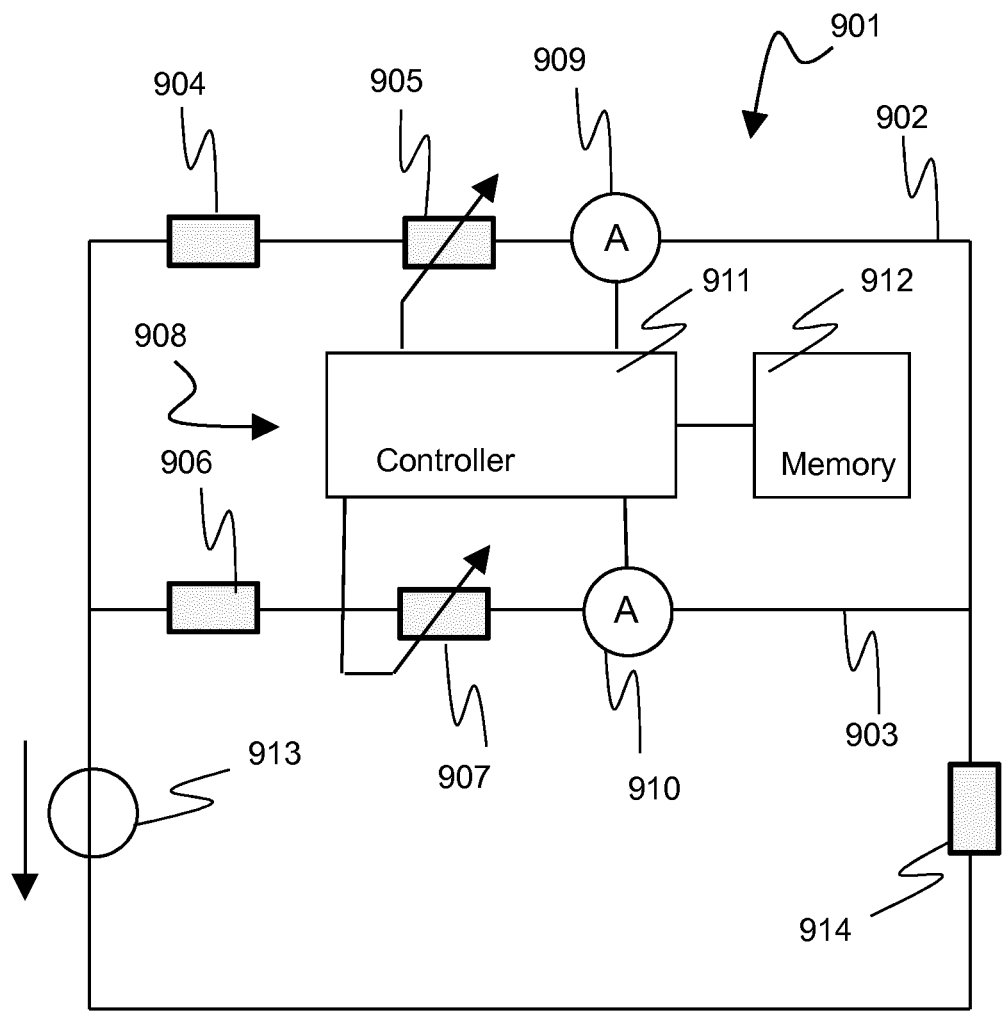
FIG. 9 illustrates exemplary structures of an apparatus for controlling a multi-channel power supply according to an embodiment of the invention.

FIG. 9 illustrates exemplary structures of an apparatus 908 for controlling a multi-channel power supply 901, which operates according to the concepts discussed. For example, the illustrated structure may be used to implement the methods discussed, e.g. with respect to FIG. 8. A voltage generator 913, typically a DC voltage generator, supplies a load 914. In the illustrated example, the multi-channel power supply 901 comprises a first channel 902 and a second channel 903. The first channel 902 comprises an intrinsic channel resistance modeled by resistor 904 and an adjustable resistor 905. The second channel 903 comprises an intrinsic channel resistance modeled by resistor 906 and an adjustable resistor 907. In case resistance of resistor 906 is greater that resistance of resistor 904, the adjustable resistor 907 will be adjusted to the lowest resistance and the remaining adjustable resistor 905 will be adjusted such that currents are balanced in the channels 902 and 903.

The apparatus 908 comprises a meter unit for measuring for each channel a measure indicative of a current in the respective channel. Examples of such a meter unit are ampere meters 909 and 910. In principle any sensor or circuit can be used that measures a measure indicative of the respective channel current. The apparatus 908 may further comprises a controller 911, which can be coupled to a memory 912. The controller 911 is adapted to adjust, on the basis of the measures (e.g. from the ampere meters 909 and 910), the adjustable resistor (e.g. resistor 907) in the channel having the highest intrinsic channel resistance to the lowest adjustable resistance and to adjust, on the basis of the measures, the adjustable resistor(s) in the remaining channel (s), such that currents in each channel are balanced. The controller 911 may be fully implemented as a circuit as e.g. discussed with respect to FIGS. 2 and 3. The controller 911 may also be implemented by a programmable device such as a microcontroller or a controller comprising a processor coupled to a memory.

In case an implementation using a memory is utilized, the memory 912 may include a read-only memory (ROM), e.g., a flash ROM, a random access memory (RAM), e.g., a dynamic RAM (DRAM) or static RAM (SRAM), a mass storage, e.g., a hard disk or solid state disk, or the like. The memory 912 includes suitably configured program code modules to be executed by the processor so as to implement the above-described functionalities of the controller of the multi-channel power supply.

It is to be understood that the structures as illustrated in FIG. 9 are merely schematic and that the apparatus and the multi-channel power supply may actually include further components which, for the sake of clarity, have not been illustrated, Also, it is to be understood that the memory may include certain program code modules, which have not been explicitly discussed.

As can be seen, the concepts as described above may be used for efficiently adjusting resistors in a multi-channel power supply to optimal values, i.e. such that currents are balanced and power dissipation of the adjustable resistors is minimized. At least some of the above concepts and embodiments support the techniques of simultaneously performing current balancing and reduction of power dissipation.

It is to be understood that the examples and embodiments as explained above are merely illustrative and susceptible to various modifications. Moreover, it is to be understood that the above concepts may be implemented by using correspondingly designed software to be executed by one or more processors of an existing device, or by using dedicated device hardware.

The invention claimed is:

1. A method for controlling a multi-channel power supply, wherein each channel comprises an intrinsic channel resistance and a resistor adjustable between a lowest resistance and a highest resistance, the method comprising:
   measuring, for each channel, a measure indicative of a current in the respective channel;
   determining, based on the measures and for each channel, a first error indicative of a deviation between the current in the respective channel and the average current of all channels;
   adjusting, based on the measures, the adjustable resistor in the channel having the highest intrinsic channel resistance to the lowest resistance; and
   adjusting, based on the measures and the first errors, one or more adjustable resistors in the remaining one or more channels, such that currents in each channel are balanced.

2. The method of claim 1, wherein each channel is built of equivalent components.

3. The method of claim 1, wherein each adjustable resistor comprises a field effect transistor.

4. The method of claim 1, wherein the multi-channel power supply comprises two, four, eight, or sixteen channels.

5. The method of claim 1, further comprising:
   determining, based on the measures, a second error indicative of a dissipated power in the adjustable resistors; and
   adjusting the adjustable resistors based on the second error.

6. The method of claim 5, wherein the second error is weighted by a parameter.

7. The method of claim 1, wherein the first error is weighted by a first parameter.

8. The method of claim 1, further comprising:
   frequently updating the measures; and
   adjusting the resistors based on the updated measures.

9. The method of claim 1, further comprising:
- determining adjustment measures for adjusting the resistors based on at least one of a second error and first errors;
- wherein the second error is indicative of a dissipated power in the adjustable resistors, and wherein the second error has been determined based on the measures;
- wherein the first errors are indicative of a deviation between the current in a respective channel and an average current of all channels, and wherein the first errors are determined based on the measures for each channel;
- adjusting the resistors based on the determined adjustment measures.

10. The method of claim 9, wherein the determining adjustment measures comprises determining adjusting measures by integrating the difference of the first errors and the second error over a time interval.

11. An apparatus for controlling a multi-channel power supply, wherein each channel comprises an intrinsic channel resistance and a resistor adjustable between a lowest resistance and a highest resistance, the apparatus comprising:
- a meter configured to measure, for each channel, a measure indicative of a current in the respective channel;
- a controller configured to:
  - determine, based on the measures and for each channel, a first error indicative of a deviation between the current in the respective channel and the average current of all channels;
  - adjust, based on the measures, the adjustable resistor in the channel having the highest intrinsic channel resistance to the lowest resistance; and
  - adjust, based on the measures and the first errors, one or more adjustable resistors in the remaining one or more channels, such that currents in each channel are balanced.

12. The apparatus of claim 11, wherein each channel is built of equivalent components.

13. The apparatus of claim 11, wherein each adjustable resistor comprises a field effect transistor.

14. The apparatus of claim 11, wherein the multi-channel power supply comprises two, four, eight, or sixteen channels.

15. The apparatus of claim 11, wherein the controller is configured to:
- determine, based on the measures, a second error indicative of a dissipated power in the adjustable resistors; and
- adjust the adjustable resistors based on the second error.

16. The apparatus of claim 15, wherein the second error is weighted by a parameter.

17. The apparatus of claim 11, wherein the first error is weighted by a first parameter.

18. The apparatus of claim 11, wherein the controller is configured to:
- frequently update the measures; and
- adjust the resistors based on the updated measures.

19. The apparatus of claim 11:
- wherein the controller is configured to determine adjustment measures for adjusting the resistors based on at least one of a second error and first errors;
- wherein the second error is indicative of a dissipated power in the adjustable resistors, and wherein the second error has been determined based on the measures;
- wherein the first errors are indicative of a deviation between the current in a respective channel and an average current of all channels, wherein the first errors are determined based on the measures for each channel;
- wherein the controller is configured to adjust the resistors based on the determined adjustment measures.

20. The apparatus of claim 19, wherein the controller is configured to determine adjustment measures by integrating the difference of the first errors and the second error over a time interval.

21. A multi-channel power supply, wherein each channel comprises an intrinsic channel resistance and a resistor adjustable between a lowest resistance and a highest resistance, the multi-channel power supply comprising:
- an apparatus for controlling the multi-channel power supply, the apparatus comprising:
  - a meter configured to measure, for each channel, a measure indicative of a current in the respective channel;
  - a controller configured to:
    - determine, based on the measures and for each channel, a first error indicative of a deviation between the current in the respective channel and the average current of all channels;
    - adjust, based on the measures, the adjustable resistor in the channel having the highest intrinsic channel resistance to the lowest resistance; and
    - adjust, based on the measures and the first errors, one or more adjustable resistors in the remaining one or more channels, such that currents in each channel are balanced.

22. A computer program product stored in a non-transitory computer readable medium for controlling a multi-channel power supply, wherein each channel comprises an intrinsic channel resistance and a resistor adjustable between a lowest resistance and a highest resistance, the computer program product comprising software instructions which, when run on a controller of the multi-channel power supply, causes the multi-channel power supply to:
- measure, for each channel, a measure indicative of a current in the respective channel;
- determine, based on the measures and for each channel, a first error indicative of a deviation between the current in the respective channel and the average current of all channels;
- adjust, based on the measures, the adjustable resistor in the channel having the highest intrinsic channel resistance to the lowest resistance; and
- adjust, based on the measures and the first errors, one or more adjustable resistors in the remaining one or more channels, such that currents in each channel are balanced.

* * * * *